United States Patent [19]

Gregory

[11] 4,261,550

[45] Apr. 14, 1981

[54] FOLDABLE HANDRAIL STRUCTURE

[76] Inventor: Miller H. Gregory, 707 S. Green St., Longview, Tex. 75692

[21] Appl. No.: 125,530

[22] Filed: Feb. 28, 1980

[51] Int. Cl.³ .............................................. E04H 17/14
[52] U.S. Cl. ...................................... 256/67; 296/156; 52/150
[58] Field of Search ............................. 256/67, 65, 59; 296/156, 162; 280/163; 52/183, 150

[56] References Cited

U.S. PATENT DOCUMENTS

| | | | |
|---|---|---|---|
| 3,463,457 | 8/1969 | Alexander | 256/59 |
| 3,964,215 | 6/1976 | Hartman et al. | 256/67 X |
| 4,029,352 | 6/1977 | Evans | 296/156 |

Primary Examiner—Andrew V. Kundrat
Attorney, Agent, or Firm—Harry W. F. Glemser

[57] ABSTRACT

A hollow handrail is pivotally connected at one end to a fixed bracket. A brace is pivotally connected at one end to another fixed bracket vertically aligned with the first-mentioned bracket. A slide is mounted in the hollow handrail and is pivotally connected with the other end of the brace. Locking means is provided on the slide for locking the handrail and brace in folded position, or in any desired angular position of adjustment. When the handrail is in its folded position, the brace is received and enclosed within the handrail.

11 Claims, 12 Drawing Figures

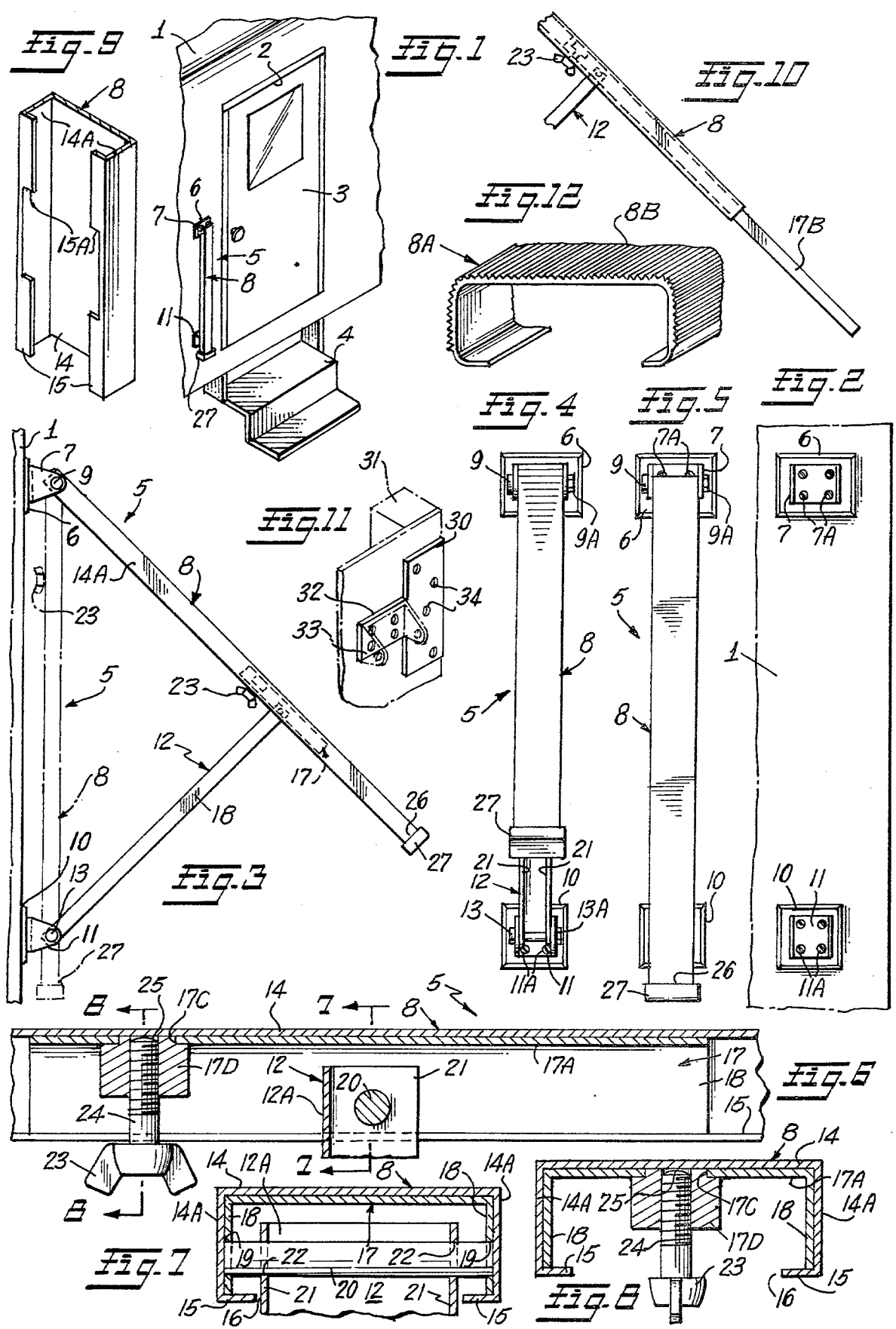

FOLDABLE HANDRAIL STRUCTURE

BACKGROUND OF THE INVENTION

1. Field of the Invention

The present invention relates to a foldable handrail structure for use with a stairway, and which can be inexpensively and readily fabricated and installed practically anywhere that a handrail is desired, for example, on trailer homes, on loading platforms, at permanent residences, on boats, etc. However, by way of illustration of one operative embodiment of the invention, the present handrail is illustrated and described herein with respect to its use on a trailer home.

2. The Prior Art

Various types of folding handrails have been heretofore devised, but few are usable on trailer homes. Such foldable handrails as have been designed for such use involve complicated structures that require considerable time to assemble and install, lack rigidity, and are not angularly adjustable, or extendable to meet varying environmental conditions that are encountered in the normal use of mobile homes. Frequently, a mobile home is required to be parked up a concrete pad that is narrow and considerably above the level of the surrounding ground, or where the ground slopes steeply away from the pad, or where there is no concrete pad and the terrain is such that the lowest trailer step is too high above the ground to be conveniently reached. This presents a serious problem, particularly for elderly persons who cannot mount the trailer steps without the assistance of a suitable handrail. Then too, there is the problem of providing a compact handrail structure that projects only a minimum distance from the trailer body.

SUMMARY OF THE INVENTION

A hollow, generally rectangular handrail, having spaced flanges at its lower side, is pivotally connected at its inner end to an upper hinge bracket mounted upon a fixed support. The outer end of the handrail is free to be moved up and down. A brace is pivotally connected at its inner end to a lower hinge bracket mounted upon the fixed support in vertical alignment with the upper hinge bracket. The brace is narrow enough to be received between the flanges on the handrail. A slide is mounted within the handrail; is movable lengthwise thereof; and is pivotally connected to the outer end of the brace. Locking means, including a wing screw, is provided on the slide, inwardly of its point of connection to the brace, for positively locking the handrail and brace in either folded or extended position, or in any desired intermediate position of adjustment. When the handrail is in its folded down position, the brace is received and enclosed within the handrail. At such time, the handrail is spaced a sufficient distance from the fixed support to afford ready access to the wing screw for locking the handrail in place. The slide may be increased in length so that it can extend beyond the free end of the handrail to form an extension thereof. The handrail can be made with rounded corners and exteriorly ribbed to provide a safety hand grip. The handrail, brace and slide can be made from readily available extruded aluminum alloy shapes. The handrail and brace, if too long for a given installation, can easily be cut to proper length by a hacksaw.

OBJECTS OF THE INVENTION

The principal object of the invention is to provide a foldable handrail structure adapted for general use with a stair step.

A more specific object is to provide a foldable handrail for a house trailer wherein the handrail, when in its folded down position, occupies a minimum of space.

Another object is to provide a foldable handrail structure that consists of a minimum number of parts that can be quickly assembled and mountd upon a fixed support.

Another object is to provide a handrail structure wherein the principal components can be made from readily available extruded aluminum alloy shapes.

Still another object is to provide a handrail that can be securely locked in either its folded or fully extended position, or in any angular position therebetween.

A further object is to provide a foldable handrail structure wherein the slide member can be made long enough to serve as an extension of the handrail.

A still further object is to provide a foldable handrail structure wherein the handrail and brace are of sufficient length to meet most installation requirements, but which can be cut to a shorter length, if necessary, to meet a particular installation requirement.

A still further object is to provide a handrail having a hand-gripping safety surface.

Other objects and advantages of the invention will be apparent from the following description taken in conjunction with the accompanying drawings.

DESCRIPTION OF THE DRAWINGS

FIG. 1 is a diagrammatic, fragmentary perspective view illustrating the present foldable handrail structure mounted upon a trailer body adjacent its door, with the handrail shown in its folded-down position.

FIG. 2 is a fragmentary front view showing the upper and lower hinge brackets and their mounting plates fastened to the trailer body in vertical alignment.

FIG. 3 is a side view of the handrail structure mounted upon a fixed support, in its fully extended position.

FIG. 4 is a front elevational view of the handrail in its fully extended position.

FIG. 5 is a front view of the handrail in its folded-down position.

FIG. 6 is an enlarged, fragmentary, longitudinal cross-sectional view through a portion of the handrail, slide, and brace, particularly showing the details of the locking means carried by the slide to lock it and the brace in place relative to the handrail.

FIG. 7 is a transverse cross-sectional view through the handrail, slide, and brace, taken on the line 7—7 of FIG. 6.

FIG. 8 is a transverse cross-sectional view through the handrail, brace, and locking means, taken on the line 8—8 of FIG. 6.

FIG. 9 is a fragmentary perspective view of the outer end of the handrail showing the notches in the flanges of the handrail provided to clear the lower hinge bracket when the handrail is in its folded-down position.

FIG. 10 is a fragmentary slide view of the handrail structure illustrating a modified form of slide, which is sufficiently long to project a substantial distance beyond the free end of the handrail to form an extension thereof.

FIG. 11 is a perspective view of a modified mounting plate having an extension projecting from one of its sides to receive a hinge bracket, for use on a certain type of trailer home.

FIG. 12 is a fragmentary perspective view of the end of a modified handrail having rounded corners, and ridges on its exterior to provide a safety hand grip.

DESCRIPTION OF THE PREFERRED EMBODIMENTS

Referring to FIG. 1, a portion of a trailer home is shown wherein the trailer body is identified by the numeral 1, and has a door opening 2 in which a door 3 is mounted. The door opening 2 may be either in the side or at the rear end of the trailer. A conventional retractable step 4 is mounted on the trailer body 1 below the door 3.

The present handrail structure is generally indicated by the numeral 5, is mounted adjacent the left side of the door opening 2, and comprises a mounting plate 6 for an upper hinge bracket 7, both being secured to the trailer body 1 by screws 7A. The inner end of a handrail 8 is disposed between the arms of, and is connected to, the hinge bracket 7 by a bolt type pin 9 held in place by a lock nut 9A. A lower mounting plate 10 and a lower hinge bracket 11 are secured to the trailer body 1 by screws 11A. The lower hinge bracket 11 is mounted in vertical alignment with the upper hinge bracket 7. The mounting plates 6 and 10 are not critical, but their use is preferred because they provide a large bearing area and will protect the trailer body 1 from damage if the hinge bracket screws 7A and 11A happen to work loose due to excessive travel vibrations. The inner end of a brace 12 is disposed between the arms of the lower hinge bracket 11 and is pivotally connected thereto by a bolt type pin 13 that is held in place by a lock nut 13A. Since the handrail 8 is wider than the brace 12, the upper hinge bracket 7 is correspondingly wider than the lower hinge bracket 11.

As is best shown in FIGS. 7 and 8, the handrail 8 is hollow; is generally rectangular in transverse cross-section and comprises a top wall 14; side walls 14A; and flanges 15 at its lower side that extend inwardly toward each other, but are separated by a space 16. It will be understood that the side walls 14A have openings to receive the hinge pin 9. A slide 17, which is U- or channel-shaped in transverse cross-section, is mounted within the handrail 8 and has a free sliding fit therein. The slide 17 has a base 17A and opposed side walls 18, each having an opening 19 to receive a pin 20. The pin 20 has a length equal to the overall width of the slide 17 so that its ends are flush with the outer face of the slides 18. The brace 12 is also U- or channel-shaped in transverse cross-section, and includes a base 12A, and side walls 21, each of which has an opening 22 adjacent its outer end for receiving the pin 20 to pivotally connect the brace to the slide 17. The brace 12 is installed so that its base 12A is uppermost when in its extended position. It will be understood that the side walls 21 have openings to receive the hinge pin 13. The brace 12 has a width slightly less than that of the space 16 between the flanges 15, as is best shown in FIG. 7, so that it can be received within the handrail 8 when it is folded down. In this connection, the flanges 15 are notched at 15A, as shown in FIG. 9, to clear the lower hinge bracket 11 and pin 13 as the handrail 8 reaches the end of its downward movement.

The slide 17 is provided with means for locking the same in place relative to the handrail 8. As is best shown in FIGS. 6 and 8, the base 17A of the slide 17 has an opening 17C in which a shouldered, threaded bushing 17D is secured by spot welding. A wing screw 23 has a shank 24 that is threaded into the bushing 17D, whereby the inner end 25 of the shank 24 can be engaged with the handrail 8 to positively lock the slide 17 against movement relative to the handrail. With this arrangement, the brace 12 can be secured to the handrail 8 with the handrail disposed in a folded down or any desired position of angular adjustment. The outer end 26 of the handrail 8 is enclosed by a tight-fitting plastic cap 27 to avoid accidental injury to anyone while reaching to grasp the handrail 8, or who otherwise comes in contact with it.

In assembling the parts, the openings 19 in the slide 17 are aligned with the openings 22 in the brace 12 and the pin 20 is inserted into the openings. The slide 17 is then slid bodily into the handrail 8. The pin 20 is confined by the sides 14A of the handrail 8 so that separate retaining means for the pin 20 is not required.

In order to raise the handrail 8 from its folded down position, shown in dot-and-dash lines in FIG. 3, to its extended position shown in full lines, the wing screw 23 is loosened and the free end of the handrail is pulled outwardly and upwardly from the trailer body 1. At the same time, the slide 17 and brace 12 are moved outwardly along the handrail 8 until the desired position of adjustment is reached; whereupon the screw 23 is tightened to hold the slide and brace in locked relation to the handrail 8. Such locking feature is important because it prevents the handrail 8 from being moved up or down when pressure is applied thereto by a person mounting the steps 4, or while a person holding the handrail is attempting to regain his balance. Furthermore, the components of the handrail structure 5 are so designed that a rigid device is provided that is free from wobble and will not collapse in use.

In order to fold down the handrail for travel, as shown in dot-and-dash lines (FIG. 3), the wing screw 23 is loosened. The brace member 12 is moved toward the side of the trailer body 1 and the free end of the handrail 8 is pushed downwardly. In its fully-down position, the handrail 8 is disposed parallel with the body 1 of the trailer. It can be locked in such position for traveling by simply tightening the wing screw 23 which is readily accessible from behind the handrail 8.

It will be understood that the handrail 8, the slide 17 and the brace 12 can be made from readily available extruded aluminum alloy shapes in lengths found to be suitable. The handrail 8 and brace 12 can be made and sold for a variety of installation conditions encountered in practice. If the handrail 8 and/or the brace 12 are too long for a given installation, their outer end can be cut off by a dealer, or the purchaser, to provide the desired length, using a conventional hacksaw. The end at which the cut is made can be sanded or filed smooth to remove any burrs. In such situation, the only additional work involved is the drilling of holes, such as the holes 22, in the outer end of the brace 12 to receive the pin 20.

FIG. 10 illustrates a modification of the handrail structure in which a slide 17B is made substantially longer than the slide 17 so that in use it extends well beyond the free end of the handrail 8 and forms an extension thereof. The slide 17B is especially useful in a situation where the trailer step is abnormally high from the ground and an extended handrail is helpful in aiding a person to mount a step.

FIG. 11 illustrates a modified mounting plate 30 that is particularly adapted for use on trailer homes having a two by two door jamb 31 defining the door opening. As is illustrated, the plate 30 has a lateral extension 32 projecting from one of its sides. A hinge bracket 33, shown in dot-and-dash lines, is adapted to be mounted upon the extension 32 and can be used for the same purpose as the upper hinge bracket 7. Suitable holes 34 are provided in the plate 30 for receiving screws (not shown) for mounting the same upon the jamb 31. It will be understood that a hinge bracket similar to the lower hinge bracket 11 may be used with the offset hinge mounting plate 30 for mounting the handrail upon the trailer body, since the lower hinge bracket can be secured to the floor seal (not shown).

Referring to FIG. 12, a modified handrail 8A is shown having rounded corners and a ribbed exterior surface 8B, which provides a safety hand grip, as well as an attractive, ornamental appearance. It will be understood that the slide (not shown) used with the handrail 8A will have an exterior contour complementary to that of the interior of the handrail.

It will be further understood that various changes may be made in the design and arrangement of the components of the foldable handrail structure described and illustrated herein, without departing from the principles of the invention or the scope of the annexed claims.

I claim:

1. A foldable handrail structure, comprising: an upper hinge bracket to be mounted upon a fixed support; a handrail; means pivotally connecting the inner end of said handrail to said upper hinge bracket, the outer end of said handrail being free; a lower hinge bracket to be mounted upon said fixed support in vertical alignment with said upper hinge bracket; a brace; means pivotally connecting the inner end of said brace to said lower hinge bracket; a slide mounted upon said handrail for movement lengthwise thereon; means pivotally connecting the outer end of said brace to said slide; and means arranged to lock said slide and brace to said handrail, with the handrail disposed in a desired position of adjustment.

2. A handrail structure as described in claim 1, wherein the locking means is mounted on the slide at a location inwardly of the means pivotally connecting the brace to said slide.

3. A foldable handrail structure as described in claim 1, in which the handrail is hollow, generally rectangular in transverse cross-section and has flanges at its lower side extending inwardly toward each other, but having their confronting edges spaced apart.

4. A handrail structure as described in claim 3, wherein the slide is U-shaped in transverse cross-section and is mounted in the handrail in inverted position, said slide having a base and sides that fit with sliding clearance in the handrail.

5. A handrail structure as described in claim 4, wherein the base of the slide has an opening; and wherein the locking means comprises a threaded bushing mounted in said opening; and a threaded member mounted in said bushing so that its inner end can engage said handrail.

6. A handrail structure as described in claim 4, wherein the brace is narrower in width than the space between the flanges on the handrail and is receivable in the handrail between said flanges when the handrail is in its folded-down position.

7. A handrail structure as described in claim 1, wherein the lower hinge bracket is narrower in width than the upper hinge bracket.

8. A foldable handrail structure as described in claim 1, wherein the portion of the slide outwardly of its pivotal connection to the brace is extra long so that it projects beyond the free end of the handrail and serves as an extension of the handrail.

9. A foldable handrail structure as described in claim 1, wherein a pair of mounting plates is provided for mounting upon the fixed support and one of the hinge brackets overlies each of said mounting plates.

10. A foldable handrail structure as described in claim 1, wherein the upper hinge mounting plate comprises an elongated strip having a lateral extension on one side edge thereof; and a hinge bracket to be mounted upon said lateral extension.

11. A foldable handrail structure as described in claim 1, wherein the outer surface of the handrail has ridges thereon to provide a safety hand grip.

* * * * *